(12) United States Patent
Terwilliger et al.

(10) Patent No.: US 11,149,649 B2
(45) Date of Patent: Oct. 19, 2021

(54) HYBRID GAS TURBINE ENGINE SYSTEM POWERED WARM-UP

(71) Applicant: United Technologies Corporation, Farmington, CT (US)

(72) Inventors: Neil Terwilliger, Meriden, CT (US); John P. Virtue, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 212 days.

(21) Appl. No.: 16/104,281

(22) Filed: Aug. 17, 2018

(65) Prior Publication Data

US 2020/0056546 A1    Feb. 20, 2020

(51) Int. Cl.
*F02C 7/268*    (2006.01)
*B64D 27/24*    (2006.01)
(Continued)

(52) U.S. Cl.
CPC .............. *F02C 7/268* (2013.01); *B64D 27/10* (2013.01); *B64D 27/24* (2013.01); *B64D 31/06* (2013.01);
(Continued)

(58) Field of Classification Search
CPC ..... F02K 5/00; B64D 2027/026; B64D 27/02; B64D 27/10; B64D 27/24; B64D 2221/00; B64D 2013/0644; B64D 33/00; B64C 25/405; F01D 15/10; F01D 19/00; F01D 19/02; F01D 25/36; F01D 25/10; F02C 6/14; F02C 7/268; F02C 7/275;
(Continued)

(56) References Cited

U.S. PATENT DOCUMENTS 7,802,757 B2    9/2010  Dooley et al.
8,690,099 B2    4/2014  Burns et al.
(Continued)

FOREIGN PATENT DOCUMENTS

EP    2006496 A1 *  12/2008  ............. F01D 25/10
EP    2006496 A1     12/2008
EP    2452878 A2      5/2012

OTHER PUBLICATIONS

EP Application No. 19191995.0 Extended EP Search Report dated Dec. 17, 2019, 7 pages.

*Primary Examiner* — Alain Chau
(74) *Attorney, Agent, or Firm* — Cantor Colburn LLP

(57) ABSTRACT

An aspect includes a hybrid gas turbine engine system of a hybrid electric aircraft. The hybrid gas turbine engine system includes a gas turbine engine, an electric motor operable to perform an electric taxiing of the hybrid electric aircraft, and a controller. The controller is operable to prevent fuel flow to the gas turbine engine during at least a portion of the electric taxiing and monitor for a powered warm-up request during the electric taxiing. A powered warm-up state of the gas turbine engine is initiated based on detecting the powered warm-up request. The powered warm-up state adds heat to one or more components of the gas turbine engine prior to transitioning to a takeoff power state. The gas turbine engine transitions from the powered warm-up state to the takeoff power state after reaching a target temperature of the one or more components in the powered warm-up state.

15 Claims, 6 Drawing Sheets

(51) Int. Cl.
   *B64D 33/00*  (2006.01)
   *F02C 9/26*  (2006.01)
   *F02C 9/54*  (2006.01)
   *F02K 5/00*  (2006.01)
   *B64D 27/02*  (2006.01)
   *F02C 6/14*  (2006.01)
   *B64D 27/10*  (2006.01)
   *B64D 31/06*  (2006.01)

(52) U.S. Cl.
   CPC .............. *B64D 33/00* (2013.01); *F02C 6/14* (2013.01); *F02C 9/26* (2013.01); *F02C 9/54* (2013.01); *F02K 5/00* (2013.01); *B64D 2027/026* (2013.01); *F05D 2260/85* (2013.01)

(58) Field of Classification Search
   CPC .... F02C 7/36; F05D 2220/76; F05D 2260/85; F05D 2270/304
   See application file for complete search history.

(56) References Cited

U.S. PATENT DOCUMENTS

| | | | | |
|---|---|---|---|---|
| 8,727,270 | B2* | 5/2014 | Burns | F02C 7/36 244/58 |
| 8,955,335 | B2 | 2/2015 | Burns | |
| 9,643,729 | B2* | 5/2017 | Walter-Robinson | B64D 27/24 |
| 10,196,923 | B2* | 2/2019 | Thomassin | F01D 17/06 |
| 10,208,675 | B2* | 2/2019 | Mackin | B64D 27/24 |
| 10,336,461 | B2* | 7/2019 | Mackin | B64D 27/10 |
| 2006/0225431 | A1* | 10/2006 | Kupratis | F01D 15/10 60/791 |
| 2006/0260323 | A1* | 11/2006 | Moulebhar | F02C 7/268 60/793 |
| 2007/0101721 | A1 | 5/2007 | Dooley et al. | |
| 2010/0083632 | A1* | 4/2010 | Foster | B64D 27/16 60/39.181 |
| 2010/0083669 | A1* | 4/2010 | Foster | B64D 31/04 60/802 |
| 2010/0126178 | A1* | 5/2010 | Hyde | F01D 15/10 60/767 |
| 2010/0327109 | A1* | 12/2010 | Dooley | F01D 15/10 244/50 |
| 2012/0119020 | A1* | 5/2012 | Burns | B64D 35/00 244/58 |
| 2012/0119021 | A1* | 5/2012 | Burns | F02C 7/32 244/58 |
| 2012/0153076 | A1* | 6/2012 | Burns | F02C 7/32 244/58 |
| 2012/0216549 | A1* | 8/2012 | Burns | F02C 7/36 60/786 |
| 2013/0181088 | A1* | 7/2013 | Casado Montero | B64C 25/405 244/50 |
| 2015/0013306 | A1* | 1/2015 | Shelley | F02K 5/00 60/224 |
| 2016/0061053 | A1* | 3/2016 | Thomassin | F02C 3/10 415/1 |
| 2017/0057650 | A1* | 3/2017 | Walter-Robinson | B64D 41/00 |
| 2017/0190441 | A1* | 7/2017 | Mackin | F02C 7/36 |
| 2017/0342908 | A1* | 11/2017 | Hon | F02C 9/20 |
| 2018/0002025 | A1 | 1/2018 | Lents et al. | |
| 2018/0003071 | A1* | 1/2018 | Lents | B64D 27/10 |
| 2018/0003072 | A1 | 1/2018 | Lents et al. | |
| 2018/0003109 | A1* | 1/2018 | Lents | B64D 27/10 |
| 2018/0266329 | A1* | 9/2018 | Mackin | H02K 7/116 |
| 2018/0363564 | A1* | 12/2018 | Geneste | F01D 15/10 |
| 2019/0322379 | A1* | 10/2019 | Mackin | B64D 27/24 |
| 2019/0323426 | A1* | 10/2019 | Mackin | F02C 9/20 |
| 2019/0323427 | A1* | 10/2019 | Mackin | F04D 25/06 |

\* cited by examiner

HYBRID GAS TURBINE ENGINE SYSTEM POWERED WARM-UP

BACKGROUND

The subject matter disclosed herein generally relates to engine systems and, more particularly, to a method and apparatus for hybrid gas turbine engine system powered warm-up.

Conventional gas turbine engines are typically operated at an idle power level during taxiing from a gate to a runway and can remain at idle power for a substantial period of time before takeoff, which consumes a quantity of fuel prior to flight. Hybrid electric aircraft use electricity to provide a portion of the power needed for aircraft propulsion by converting electricity into a propulsive force. A hybrid electric aircraft can use an electric drive to support taxiing operations on a runway and prevent fuel burn typical of conventional gas turbine engine idling.

BRIEF DESCRIPTION

According to one embodiment, a hybrid gas turbine engine system of a hybrid electric aircraft is provided. The hybrid gas turbine engine system includes a gas turbine engine, an electric motor operable to perform an electric taxiing of the hybrid electric aircraft, and a controller. The controller is operable to prevent fuel flow to the gas turbine engine during at least a portion of the electric taxiing and monitor for a powered warm-up request during the electric taxiing. A powered warm-up state of the gas turbine engine is initiated based on detecting the powered warm-up request. The powered warm-up state adds heat to one or more components of the gas turbine engine prior to transitioning to a takeoff power state. The gas turbine engine transitions from the powered warm-up state to the takeoff power state after reaching a target temperature of the one or more components in the powered warm-up state.

In addition to one or more of the features described above or below, or as an alternative, further embodiments may include where the powered warm-up state includes enabling one or more electric heaters.

In addition to one or more of the features described above or below, or as an alternative, further embodiments may include where the gas turbine engine includes a low speed spool and a high speed spool.

In addition to one or more of the features described above or below, or as an alternative, further embodiments may include where the high speed spool is motored in reverse to urge heat in a reverse flow direction in the powered warm-up state.

In addition to one or more of the features described above or below, or as an alternative, further embodiments may include where the high speed spool is motored with a sub-idle fuel flow in the powered warm-up state.

In addition to one or more of the features described above or below, or as an alternative, further embodiments may include a generator operably coupled to the low speed spool of the gas turbine engine, and the gas turbine engine can be operated with a higher engine power setting above idle to drive rotation of the generator and produce idle thrust during after the electric taxiing.

In addition to one or more of the features described above or below, or as an alternative, further embodiments may include where the generator is a motor-generator operable in a generator mode to charge a battery system and in a motor mode to provide supplemental rotation force to the gas turbine engine.

In addition to one or more of the features described above or below, or as an alternative, further embodiments may include where the generator provides power for motoring the high speed spool and/or charging a battery system.

In addition to one or more of the features described above or below, or as an alternative, further embodiments may include where a combination of vane positions and power setting of the gas turbine engine reduces a compressor efficiency of the gas turbine engine to increase temperature at or below idle thrust in the powered warm-up state.

According to another embodiment, a propulsion system for a hybrid electric aircraft includes a gas turbine engine with a low speed spool, a high speed spool, and a combustor. The propulsion system also includes an electric motor operably coupled to the high speed spool and a controller. The controller is operable to prevent fuel flow to the combustor of the gas turbine engine during at least a portion of an electric taxiing of the hybrid electric aircraft and monitor for a powered warm-up request during the electric taxiing. A powered warm-up state of the gas turbine engine is initiated based on detecting the powered warm-up request. The powered warm-up state adds heat to one or more components of the gas turbine engine prior to transitioning to a takeoff power state. The gas turbine engine transitions from the powered warm-up state to the takeoff power state after reaching a target temperature of the one or more components in the powered warm-up state.

According to another embodiment, a method of providing a powered warm-up for a gas turbine engine of a hybrid electric aircraft includes preventing fuel flow to the gas turbine engine during at least a portion of an electric taxiing of the hybrid electric aircraft and monitoring for a powered warm-up request during the electric taxiing. A powered warm-up state of the gas turbine engine is initiated based on detecting the powered warm-up request. The powered warm-up state adds heat to one or more components of the gas turbine engine prior to transitioning to a takeoff power state. The gas turbine engine transitions from the powered warm-up state to the takeoff power state after reaching a target temperature of the one or more components in the powered warm-up state.

A technical effect of the apparatus, systems and methods is achieved by providing a powered warm-up state for a hybrid gas turbine engine system during electric taxiing as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
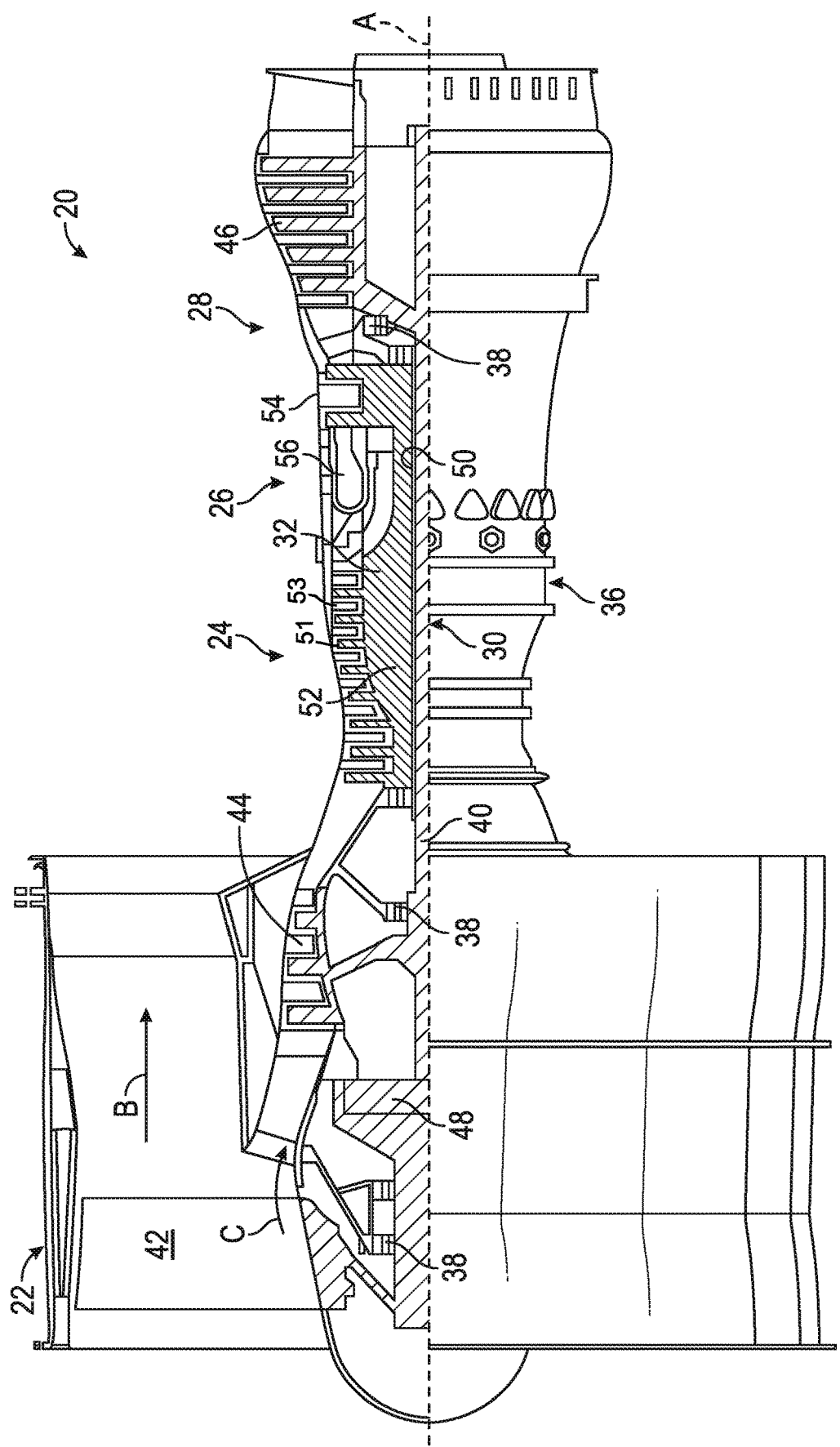
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes. The low pressure compressor 44, low pressure turbine 46, high pressure compressor 52, and high pressure turbine 54 can each be formed of alternating stages of blades 51 and vanes 53.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{\wedge}0.5$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
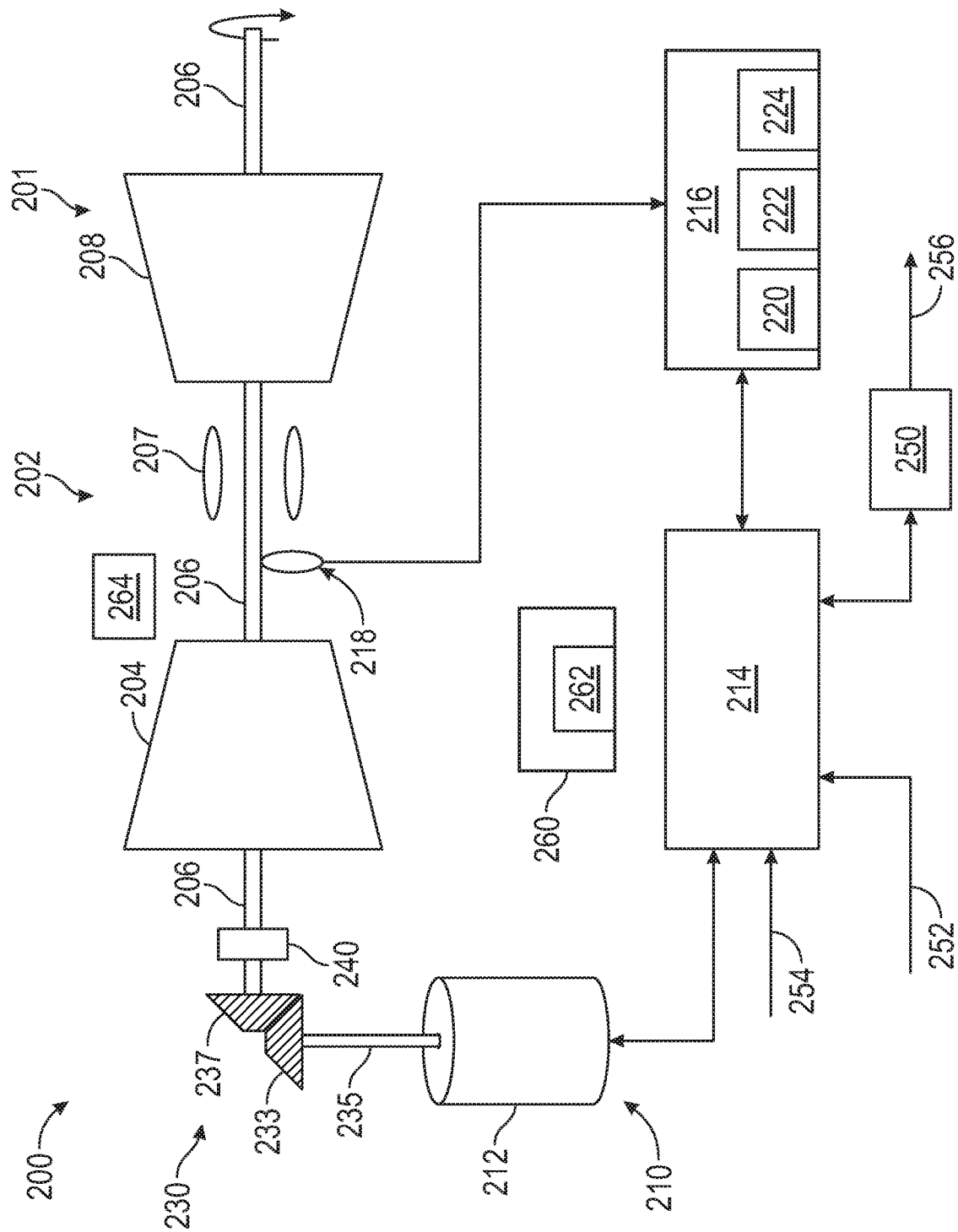
FIG. 2 is a schematic diagram of a hybrid gas turbine engine system, in accordance with an embodiment of the disclosure.

FIG. 2 illustrates a hybrid gas turbine engine system 201 including a rotor system 202 that includes at least one compressor section 204 and at least one turbine section 208 operably coupled to a shaft 206 as part of a hybrid electric aircraft 200. The rotor system 202 can be a spool of the gas turbine engine 20 of FIG. 1, such as the low speed spool 30 or the high speed spool 32. For example, when embodied as the low speed spool 30, the at least one compressor section 204 can be equivalent to the low pressure compressor 44, the shaft 206 can be equivalent to the inner shaft 40, and the at least one turbine section 208 can be equivalent to the low pressure turbine 46 of FIG. 1. When embodied as the high speed spool 32, the at least one compressor section 204 can be equivalent to the high pressure compressor 52, the shaft 206 can be equivalent to the outer shaft 50, and the at least one turbine section 208 can be equivalent to the high pressure turbine 54 of FIG. 1.

In the example of FIG. 2, an electric power system 210 is operably coupled to the rotor system 202. The electric power system 210 includes a motor-generator 212 operably coupled to the shaft 206. The motor-generator 212 can be configured as an electric motor or a generator depending upon an operational mode or system configuration. In the example of FIG. 2, a geared interface 230 operably couples the motor-generator 212 to the shaft 206. The geared interface 230 can include, for instance, an auxiliary gear 233 coupled to an auxiliary shaft 235 driven by the motor-generator 212. The geared interface 230 can also include a rotor gear 237 coupled to the shaft 206. The auxiliary gear 233 and the rotor gear 237 can each be beveled gears. The auxiliary shaft 235 can be a tower shaft. A disconnect 240, such as a clutch, can be positioned between the motor-generator 212 and a portion of the shaft 206 such that the motor-generator 212 can be selectively engaged and disengaged to rotate with rotation of the shaft 206. In alternate embodiments, the motor-generator 212 is operably coupled to the shaft 206 absent the geared interface 230 (e.g., direct coupling).

The electric power system 210 also includes converter electronics 214 operable to condition current to/from the motor-generator 212. In some embodiments, the motor-generator 212 is configured in a generator mode to charge a battery system 250 and in a motor mode to provide supplemental rotation force to the rotor system 202 of gas turbine engine 20 of FIG. 1. The motor-generator 212 can include conventional motor and generator components, such as a rotor and stator, including a plurality of windings and/or permanent magnets. The converter electronics 214 can also include conventional current control electronics, such as filters, switching components, rectifiers, inverters, voltage converters, and the like. The motor-generator 212 can perform as a variable frequency generator in a generator mode due to speed fluctuations of rotation of the shaft 206, which may be primarily driven by the at least one turbine section 208. Alternatively, a frequency normalizing component can interface with the motor-generator 212 to produce a constant frequency output (e.g., through the converter electronics 214 or as a mechanical interface between the motor-generator 212 and the shaft 206). In some embodiments, the motor-generator 212 may be operable as a starter motor to partially or completely power rotation of the shaft 206 in a starting mode of operation (e.g., to start the gas turbine engine 20 of FIG. 1) and/or can provide supplemental power to the shaft 206 during various flight phases of the hybrid electric aircraft 200. Other uses and functions for the motor-generator 212 are contemplated.

The converter electronics 214 can control charging of the battery system 250 responsive to a controller 216. The controller 216 can enable a flow of a charging current from the motor-generator 212 or a power input 252 to charge the battery system 250 as regulated and conditioned through the converter electronics 214. The power input 252 can be an external input, such as power received through a plug interface while the hybrid electric aircraft 200 is on the ground at a ground-based power source, e.g., at a gate or service location. In some embodiments, the converter electronics 214 may receive electric current from an auxiliary power input 254 to provide a supplemental or alternative power source for charging the battery system 250. For instance, the auxiliary power input 254 may receive electric current from an auxiliary power unit (not depicted) or another instance of the gas turbine engine 20 on the hybrid electric aircraft 200. The charge stored in the battery system 250 can provide an electric current for a propulsion system use 256, which may include powering one or more electric motors of the hybrid electric aircraft 200 during various operational states and/or providing power to the motor-generator 212 when operating in a motor mode, for instance, to assist in driving rotation of shaft 206. The propulsion system use 256 can be part of the gas turbine engine 20 that includes the rotor system 202 or another aircraft system, such as another instance of the gas turbine engine 20 on the hybrid electric aircraft 200. Further, the propulsion system use 256 can include powering one or more electric heaters 262, 264, for instance, during a powered warm-up state of the gas turbine engine 20. One or more electric heaters 262 can warm an oil tank 260 to add heat to lubricating oil, for instance, to transfer heat to other components of the gas turbine engine 20 and/or alter viscosity of the lubricating oil. One or more electric heaters 264 can heat a portion of the compressor section 204, such as a rear portion of the high pressure compressor 52 of FIG. 1.

In embodiments, the controller 216 of the electric power system 210 can monitor one or more rotor system sensors 218 while the rotor system 202 is rotating. The rotor system sensors 218 can be any type or combination of sensors operable to measure aspects of the motion of the rotor system 202. For example, the rotor system sensors 218 can include one or more accelerometers, speed sensors, torque sensors, and the like. The rotor system sensors 218 can be existing sensors used for controlling the gas turbine engine 20. The controller 216 can control a charging of the battery system 250, for instance, by selecting the source of electric current received through the converter electronics 214. Data collected from the rotor system sensors 218 can be used to determine an operational status of a gas turbine engine 20 of FIG. 2. Alternatively, the operational status of a gas turbine engine 20 can be received as a signal or message from an alternate source, such as an engine system or aircraft communication bus. The controller 216 may also control other system aspects, such as controlling operation of the gas turbine engine 20 of FIG. 1. For example, the controller 216 can be integrally formed or otherwise in communication with a full authority digital engine control (FADEC) of the gas turbine engine 20. The rotor system sensors 218 need not be directly coupled to the controller 216, as sensor data or sensor-derived data can be observed or determined by another control (e.g., a FADEC) and provided to the controller 216. In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the converter electronics 214 and/or other systems (not depicted).

The controller 216 is operable to determine when to charge the battery system 250 and when to use the battery system 250. During powered warm-up state, the motor-generator 212 can charge the battery system 250 while putting an increased load on the rotor system 202 of the gas turbine engine 20 to more rapidly add heat. Upon transitioning to the takeoff power state, charging can be halted to reduce loading on the gas turbine engine 20. In some embodiments, the motor-generator 212 can transition to a motor mode during takeoff to provide supplemental rotational force to the shaft 206. Further, supplemental or replacement current can be provided for battery charging or to supply other electric loads through the auxiliary power input 254. Alternate transition points and operational states to support powered warm-up state are contemplated. Powered warm-up state adds heat to one or more components of the gas turbine engine 20 prior to transitioning to a takeoff power state, as depicted in the example plot 400 of FIG. 4.

Figure 4:
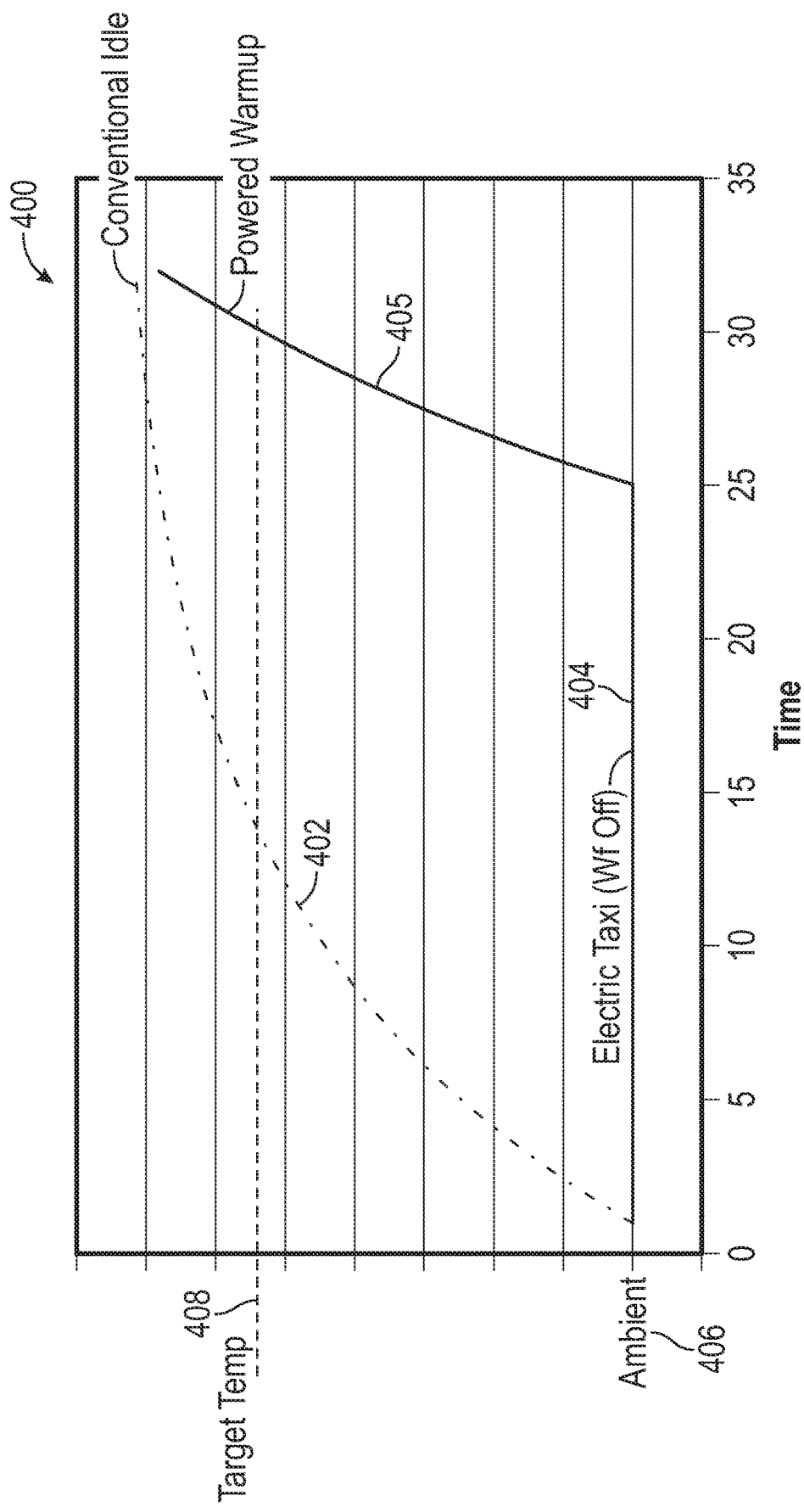
FIG. 4 is a temperature plot, in accordance with an embodiment of the disclosure.

As illustrated in FIG. 4, a conventional idle state gradually increases temperature over time as a conventional idle state temperature 402 from ambient 406 through a target temperature 408 and beyond. The target temperature 408 indicates a desired temperature level to enhance efficiency and operational performance of the gas turbine engine 20 prior to takeoff. In embodiments, while electric taxiing is performed at an electric taxiing temperature 404, fuel flow to combustor 207 (e.g., combustor 56 of FIG. 1) may be blocked/prevented, keeping the gas turbine engine 20 at or near ambient 406. Upon initiation of a powered warm-up state (e.g., based on detecting a powered warm-up request), heating of the gas turbine engine 20 can occur at a faster rate as a powered warm-up state temperature 405 than the conventional idle state temperature 402. After reaching the target temperature 408, the gas turbine engine 20 can transition from the powered warm-up state to a takeoff power state.

Figure 5:
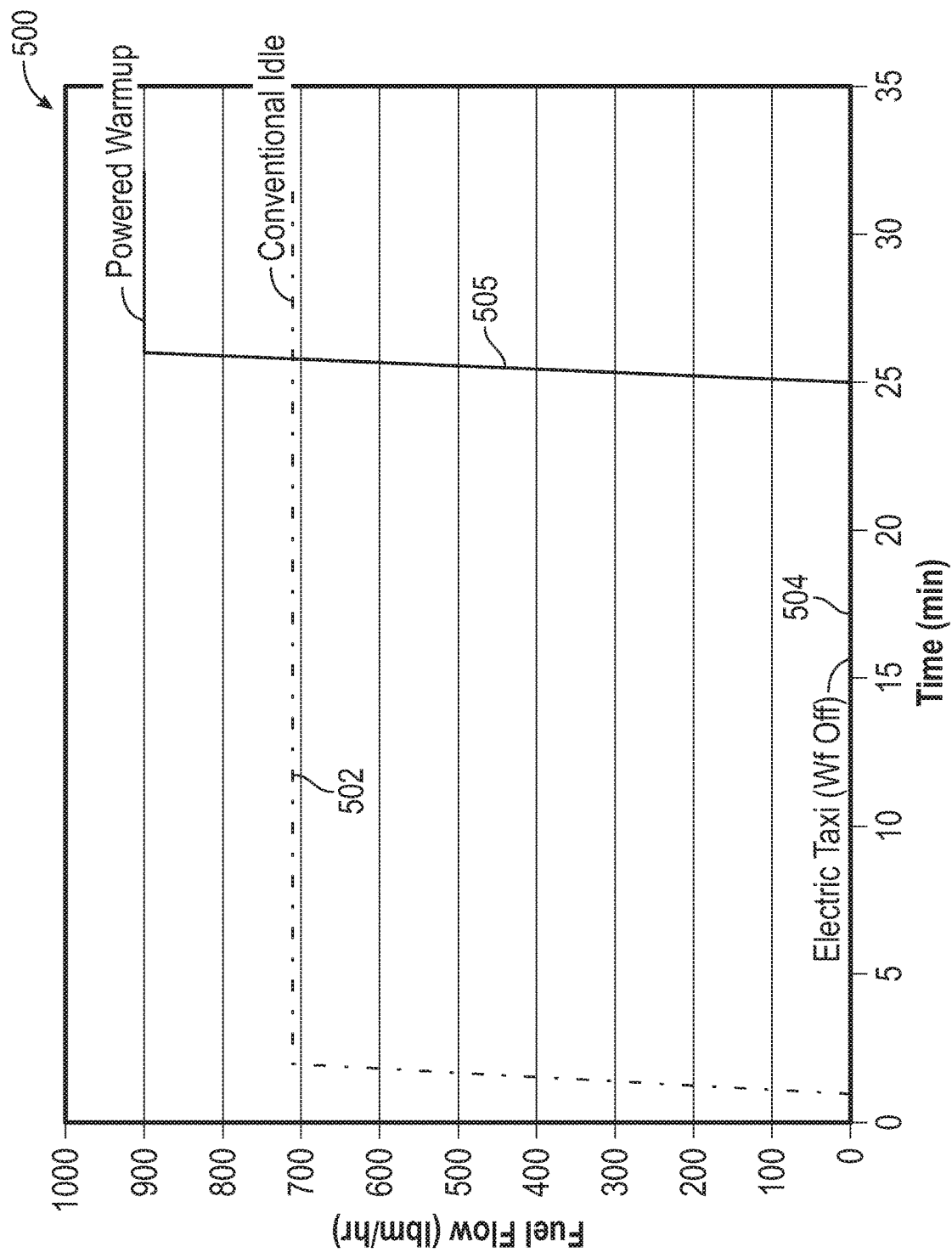
FIG. 5 is a fuel flow plot, in accordance with an embodiment of the disclosure.

There can also be differences in fuel flow between a conventional idle state and a powered warm-up state. For example, as depicted in the example plot 500 of FIG. 5, a conventional idle fuel flow 502 may rise early and hold steady for a substantial period of time during idle. An electric taxiing fuel flow 504 may be at or near zero during electric taxiing until transitioning to a powered warmup state (e.g., after completion of electric taxiing) where a powered warmup fuel flow 505 rises above the conventional idle fuel flow 502. However, the total fuel consumption in the combination of electric taxiing and the powered warmup fuel flow 505 may be less than the total fuel consumption of the conventional idle fuel flow 502.

Figure 3:
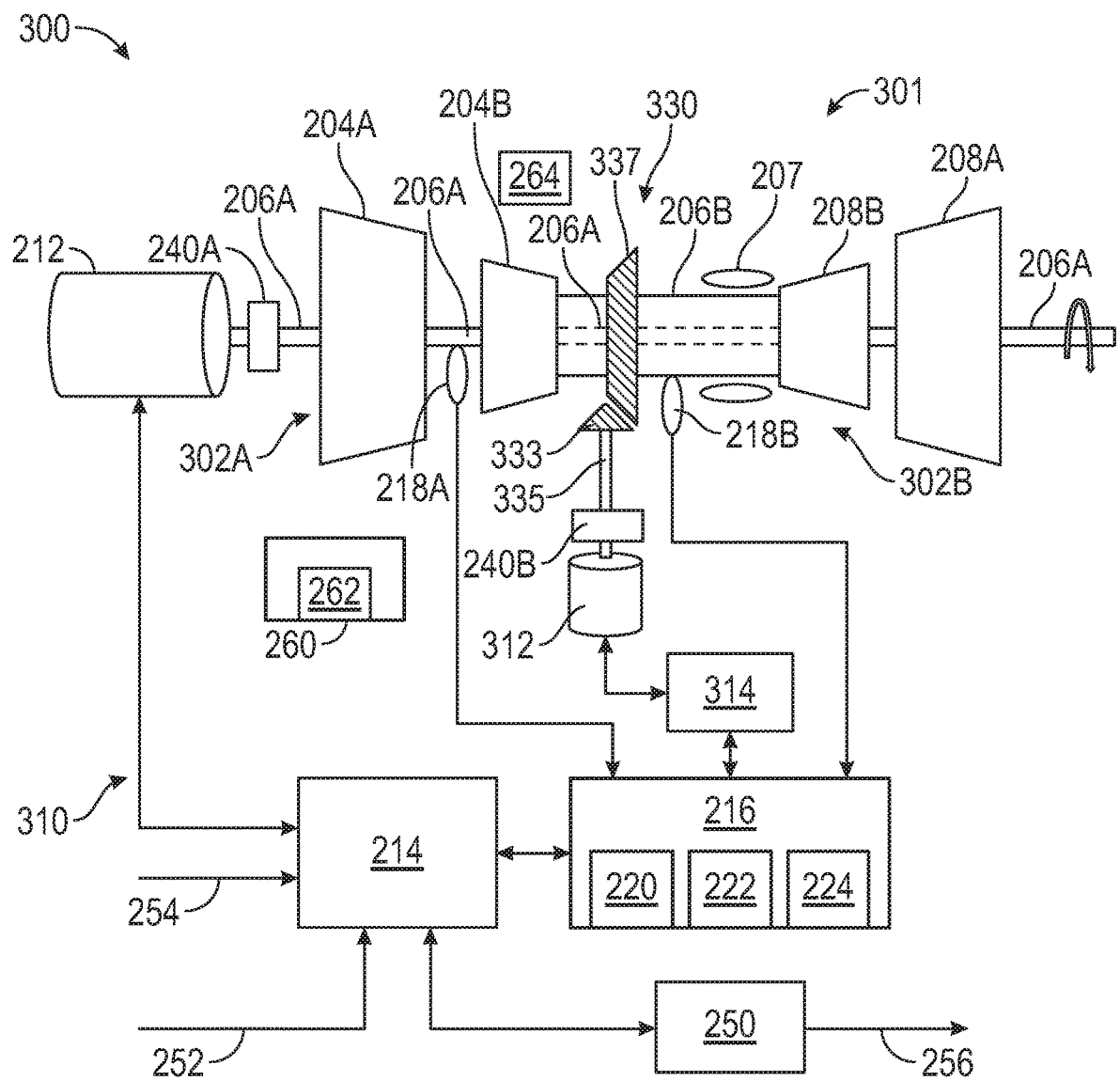
FIG. 3 is a schematic diagram of a hybrid gas turbine engine system, in accordance with an embodiment of the disclosure.

FIG. 3 is a schematic diagram of a hybrid gas turbine engine system 301 as part of a hybrid electric aircraft 300 according to an embodiment. The hybrid gas turbine engine system 301 includes a first rotor system 302A and a second rotor system 302B, which may be an embodiment of the gas turbine engine 20 of FIG. 1. For instance, the first rotor system 302A can be the low speed spool 30 of the gas turbine engine 20, and the second rotor system 302B can be the high speed spool 32 of the gas turbine engine 20. The first rotor system 302A can include a first compressor section 204A and a first turbine section 208A operably coupled to a first shaft 206A. The second rotor system 302B can include a second compressor section 204B and a second turbine section 208B operably coupled to a second shaft 206B, where the second shaft 206B is concentrically arranged with respect to the first shaft 206A. With respect to the gas turbine engine 20 of FIG. 1, the first compressor section 204A can be equivalent to the low pressure compressor 44, the first shaft 206A can be equivalent to the inner shaft 40, and the first turbine section 208A can be equivalent to the low pressure turbine 46 of FIG. 1. Similarly, the second compressor section 204B can be equivalent to the high pressure compressor 52, the second shaft 206B can be equivalent to the outer shaft 50, and the second turbine section 208B can be equivalent to the high pressure turbine 54 of FIG. 1.

In the example of FIG. 3, an electric power system 310 includes a motor-generator 212 operably coupled to converter electronics 214 and an electric motor 312 driven by drive electronics 314. A first set of one or more rotor system sensors 218A may be associated with the first rotor system 302A, and a second set of one or more rotor system sensors 218B may be associated with the second rotor system 302B. The converter electronics 214 can control charging of the battery system 250 and conditioning current to/from the motor-generator 212 responsive to a controller 216 that may receive sensor data from the first set of one or more rotor system sensors 218A and the second set of one or more rotor system sensors 218B. The controller 216 may control the electric motor 312 through the drive electronics 314 responsive to sensor data from the first set of one or more rotor system sensors 218A and/or the second set of one or more rotor system sensors 218B. In other embodiments, the controller 216 is further subdivided as two or more separate controls, for instance, where a separate instance of the controller 216 is provided for each of the motor-generator 212 and the electric motor 312. The motor-generator 212 (when operated in a motor mode) and the electric motor 312 can be independently controlled to each supply a supplemental motive force to the respective shafts 206A, 206B, where fuel combustion in the combustor 207 can provide a primary motive force for the first rotor system 302A as the low speed spool 30 and for the second rotor system 302B as the high speed spool 32. In some embodiments, the motor-generator 212 and the electric motor 312 can each be configured in either a generator mode or a motor mode.

The motor-generator 212 can be operably coupled to the first shaft 206A using a direct coupling, while the electric motor 312 can be operably coupled to the second shaft 206B using a geared interface 330. A first disconnect 240A, such as a clutch, can be positioned between the motor-generator 212 and a portion of the first shaft 206A, and a second disconnect 240B can be positioned between the electric motor 312 and a portion of the second shaft 206B. The geared interface 330 can include, for instance, a motor gear 333 coupled to a motor shaft 335 driven by the electric motor 312 and a rotor gear 337 coupled to the second shaft 206B. While the example of FIG. 3 depicts the electric power system 310 with the motor-generator 212 and electric motor 312 in different coupling configurations, it will be understood that both of the motor-generator 212 and electric motor 312 can be directly or indirectly coupled to corresponding first and second shafts 206A, 206B. For instance, the motor-generator 212 may be indirectly coupled through a tower shaft to the first shaft 206A, while the electric motor 312 is directly coupled to the second shaft 206B. Further, the coupling locations of the motor-generator 212 and electric motor 312 to the first and second shafts 206A, 206B can vary, and the coupling locations depicted in FIG. 3 are merely one example.

In the example of FIG. 3, the propulsion system use 256 can be to provide electrical power to the electric motor 312, power one or more electric heaters 262, 264, provide electrical power to the motor-generator 212 when operating in a motor mode, and/or other uses. In embodiments, the controller 216 may disable or provide limited current to the electric motor 312 while the battery system 250 is being charged by one or more of the motor-generator 212, the power input 252, and/or the auxiliary power input 254.

Electric current produced by the motor-generator 212 above a level needed to charge the battery system 250 may be provided to other on-board uses.

Figure 6:
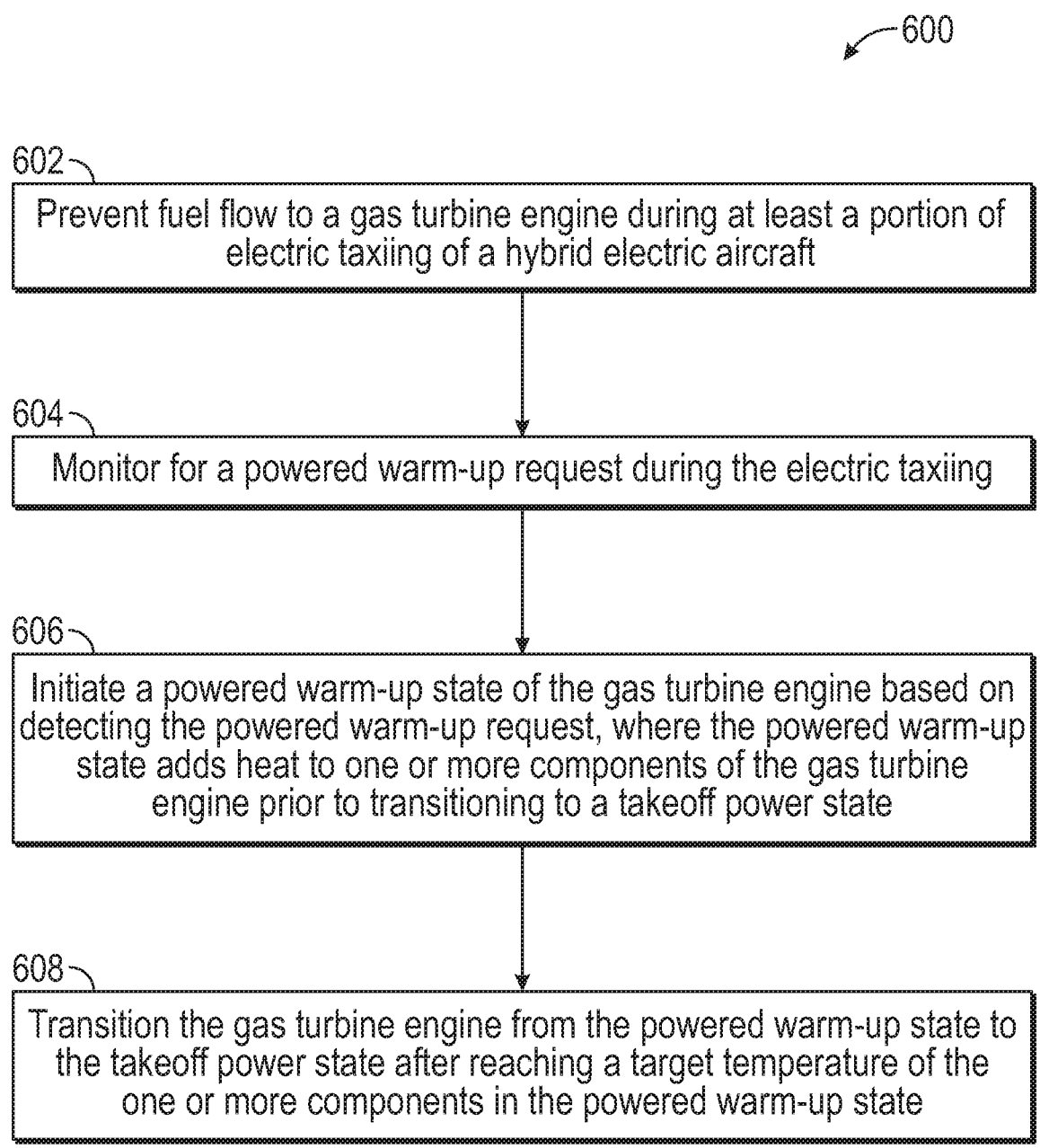
FIG. 6 is a flow chart illustrating a method, in accordance with an embodiment of the disclosure.

Referring now to FIG. 6 with continued reference to FIGS. 1-5, FIG. 6 is a flow chart illustrating a method 600 for hybrid gas turbine engine system powered warm-up, in accordance with an embodiment. The method 600 may be performed, for example, by the systems 210, 310 of FIGS. 2 and 3. For purposes of explanation, the method 600 is described primarily with respect to the system 210 of FIG. 2; however, it will be understood that the method 600 can be performed on other configurations, such as the system 310 of FIG. 3 as well as other configurations (not depicted).

At block 602, the controller 216 can prevent fuel flow to the combustor 56 of the gas turbine engine 20 during at least a portion of electric taxiing of the hybrid electric aircraft 200, 300. At block 604, the controller 216 can monitor for a powered warm-up request during the electric taxiing. A powered warm-up state request can be received as a message, for instance, a pilot initiated command. At block 606, the controller 216 can initiate a powered warm-up state of the gas turbine engine 20 based on detecting the powered warm-up request, where the powered warm-up state adds heat to one or more components of the gas turbine engine 20 prior to transitioning to a takeoff power state. Adding of heat is not limited to the use of electric heaters 262, 264 but can include any means of adding heat to one or more components of the gas turbine engine 20, such as starting combustion and operating the gas turbine engine 20 above a nominal idle fuel flow rate after electric taxiing, for example. At block 608, the controller 216 can transition the gas turbine engine 20 from the powered warm-up state to the takeoff power state after reaching a target temperature 408 of the one or more components in the powered warm-up state. Engine spool rotational speed, throttle commands, and other inputs received at the controller 216 can be used to determine the operational status of the gas turbine engine 20.

An electric motor, such as motor-generator 212 or electric motor 312, can be used to drive rotation of the gas turbine engine 20 as part of electric taxiing. Alternatively, electric taxiing can include the use of an electric motor to push, pull, or drive ground wheel rotation of the hybrid electric aircraft 200, 300 while on the ground.

In embodiments, the powered warm-up state can include enabling one or more electric heaters 262, 264. Further, in powered warm-up state, the high speed spool 32 can be motored in reverse to urge heat in a reverse flow direction as compared to normal engine operation. The powered warm-up state can include motoring the high speed spool 32 with a sub-idle fuel flow. Further, the gas turbine engine 20 can be operated with a higher engine power setting above idle to drive rotation of a motor-generator 212 operably coupled to the low speed spool 30 and produce idle thrust after the electric taxiing. As a further option for powered warm-up state, the controller 216 can command a combination of vane positions (e.g., vanes 53) and power setting of the gas turbine engine 20 that reduces a compressor efficiency of the gas turbine engine 20 to increase temperature at or below idle thrust.

While the above description has described the flow process of FIG. 6 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid gas turbine engine system of a hybrid electric aircraft, the hybrid gas turbine engine system comprising:
   a gas turbine engine comprising a low speed spool and a high speed spool;
   a generator operably coupled to the low speed spool of the gas turbine engine;
   a high spool electric motor operably coupled to the high speed spool;
   an electric motor operable to perform an electric taxiing of the hybrid electric aircraft; and
   a controller configured to:
      prevent commanding of fuel flow to the gas turbine engine during at least a portion of the electric taxiing;
      monitor for a powered warm-up request during the electric taxiing;
      initiate a powered warm-up state of the gas turbine engine based on detecting the powered warm-up request;
      control the hybrid gas turbine engine system in the powered warm-up state to add heat to one or more components of the gas turbine engine prior to transitioning to a takeoff power state by operating the gas turbine engine with a higher engine power setting above idle to drive rotation of the generator, transfer power from the generator to the high spool electric motor, and produce idle thrust after the electric taxiing; and
      transition the gas turbine engine from the powered warm-up state to the takeoff power state after reaching a target temperature of the one or more components in the powered warm-up state.

2. The hybrid gas turbine engine system of claim 1, comprising one or more electric heaters, wherein the controller is configured to power the one or more electric heaters in the powered warm-up state.

3. The hybrid gas turbine engine system of claim 1, wherein the generator is a motor-generator operable in a generator mode to charge a battery system and in a motor mode to provide supplemental rotation force to the gas turbine engine.

4. The hybrid gas turbine engine system of claim 1, wherein the generator is configured to provide power for motoring the high speed spool and/or charging a battery system.

5. The hybrid gas turbine engine system of claim 1, wherein the gas turbine engine comprises a compressor and a plurality of vanes, wherein a combination of vane positions and power setting of the gas turbine engine is configured to reduce a compressor efficiency of the gas turbine engine to increase temperature at or below idle thrust in the powered warm-up state.

6. A propulsion system for a hybrid electric aircraft, the propulsion system comprising:
- a gas turbine engine comprising a low speed spool, a high speed spool, and a combustor;
- a generator operably coupled to the low speed spool of the gas turbine engine;
- an electric motor operably coupled to the high speed spool; and
- a controller configured to:
  - prevent commanding of fuel flow to the combustor of the gas turbine engine during at least a portion of an electric taxiing of the hybrid electric aircraft;
  - monitor for a powered warm-up request during the electric taxiing;
  - initiate a powered warm-up state of the gas turbine engine based on detecting the powered warm-up request;
  - control the hybrid gas turbine engine system in the powered warm-up state to add heat to one or more components of the gas turbine engine prior to transitioning to a takeoff power state by operating the gas turbine engine with a higher engine power setting above idle to drive rotation of the generator, transfer power from the generator to the electric motor, and produce idle thrust after the electric taxiing; and
  - transition the gas turbine engine from the powered warm-up state to the takeoff power state after reaching a target temperature of the one or more components in the powered warm-up state.

7. The propulsion system of claim 6, comprising one or more electric heaters, wherein the controller is configured to power the one or more electric heaters in the powered warm-up state.

8. The propulsion system of claim 6, wherein the controller is configured to motor the high speed spool in reverse to urge heat in a reverse flow direction in the powered warm-up state as compared to a flow direction during normal gas turbine engine operation.

9. The propulsion system of claim 6,
wherein the generator is a motor-generator operable in a generator mode to charge a battery system and/or provide power for motoring the high speed spool, and the generator is operable in a motor mode to provide supplemental rotation force to the gas turbine engine.

10. The propulsion system of claim 6, wherein the gas turbine engine comprises a compressor and a plurality of vanes, wherein a combination of vane positions and power setting of the gas turbine engine is configured to reduce a compressor efficiency of the gas turbine engine to increase temperature of the one or more components of the gas turbine engine at or below idle thrust in the powered warm-up state.

11. A method of providing a powered warm-up for a gas turbine engine of a hybrid electric aircraft, the method comprising:
- preventing a command of fuel flow to the gas turbine engine during at least a portion of an electric taxiing of the hybrid electric aircraft, wherein the gas turbine engine comprises a low speed spool and a high speed spool, and the electric taxiing is performed by an electric motor;
- monitoring for a powered warm-up request during the electric taxiing;
- initiating a powered warm-up state of the gas turbine engine based on detecting the powered warm-up request;
- controlling the hybrid gas turbine engine system in the powered warm-up state to add heat to one or more components of the gas turbine engine prior to transitioning to a takeoff power state by operating the gas turbine engine with a higher engine power setting above idle to drive rotation of a generator operably coupled to the low speed spool of the gas turbine engine, transfer power from the generator to a high spool electric motor operably coupled to the high speed spool, and produce idle thrust after the electric taxiing; and
- transitioning the gas turbine engine from the powered warm-up state to the takeoff power state after reaching a target temperature of the one or more components in the powered warm-up state.

12. The method of claim 11, wherein the powered warm-up state comprises powering one or more electric heaters.

13. The method of claim 11,
wherein the generator is a motor-generator operable in a generator mode to charge a battery system and/or provide power for motoring the high speed spool, and the generator is operable in a motor mode to provide supplemental rotation force to the gas turbine engine.

14. The method of claim 11, further comprising:
commanding a combination of vane positions and power setting of the gas turbine engine that reduces a compressor efficiency of the gas turbine engine to increase temperature at or below idle thrust in the powered warm-up state.

15. A hybrid gas turbine engine system of a hybrid electric aircraft, the hybrid gas turbine engine system comprising:
- a gas turbine engine comprising a low speed spool and a high speed spool;
- an electric motor operable to perform an electric taxiing of the hybrid electric aircraft; and
- a controller configured to:
  - prevent commanding of fuel flow to the gas turbine engine during at least a portion of the electric taxiing;
  - monitor for a powered warm-up request during the electric taxiing;
  - initiate a powered warm-up state of the gas turbine engine based on detecting the powered warm-up request;
  - control the hybrid gas turbine engine system in the powered warm-up state to add heat to one or more components of the gas turbine engine prior to transitioning to a takeoff power state by motoring the high speed spool in reverse to urge heat in a reverse flow direction in the powered warm-up state as compared to a flow direction during normal gas turbine engine operation; and transition the gas turbine engine from the powered warm-up state to the takeoff power state after reaching a target temperature of the one or more components in the powered warm-up state.

\* \* \* \* \*